(12) United States Patent
Matsuzaki et al.

(10) Patent No.: US 6,650,612 B1
(45) Date of Patent: Nov. 18, 2003

(54) OPTICAL HEAD AND RECORDING REPRODUCTION METHOD

(75) Inventors: Keiichi Matsuzaki, Osaka (JP); Teruhiro Shiono, Osaka (JP); Ken'ichi Kasazumi, Osaka (JP); Tetsuo Saimi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/536,910

(22) Filed: Mar. 28, 2000

(30) Foreign Application Priority Data

Mar. 31, 1999 (JP) ............................................. 11-092564

(51) Int. Cl.[7] ................................................. G11B 7/00
(52) U.S. Cl. ............................. 369/112.05; 369/44.23; 369/44.37
(58) Field of Search ............................ 369/103, 112.01, 369/112.07, 112.21, 112.17, 118, 121, 44.23, 53.2, 94, 275.5, 44.11, 44.22, 44.37, 44.38, 112.05

(56) References Cited

U.S. PATENT DOCUMENTS

| | | | | |
|---|---|---|---|---|
| 4,725,721 A | * | 2/1988 | Nakamura et al. | 250/201.5 |
| 5,161,040 A | * | 11/1992 | Yokoyama et al. | 359/19 |
| 5,202,867 A | * | 4/1993 | Matsui et al. | 369/44.23 |
| 5,631,779 A | * | 5/1997 | Kashima | 359/742 |
| 5,703,856 A | * | 12/1997 | Hayashi et al. | 369/53.2 |
| 5,923,636 A | * | 7/1999 | Haruguchi et al. | 369/112.12 |
| 6,078,555 A | * | 6/2000 | Lee et al. | 369/118 |
| 6,081,498 A | * | 6/2000 | Yoo et al. | 369/112.21 |
| 6,115,349 A | * | 9/2000 | Tawa et al. | 369/118 |
| 6,222,801 B1 | * | 4/2001 | Yoo et al. | 369/118 |
| 6,304,540 B1 | * | 10/2001 | Yoo et al. | 369/103 |
| 6,337,841 B1 | * | 1/2002 | Kim et al. | 369/112.06 |
| 6,344,935 B1 | * | 2/2002 | Maruyama | 369/112.26 |
| 6,373,807 B1 | * | 4/2002 | Ohtaki et al. | 369/112.01 |
| 6,377,536 B1 | * | 4/2002 | Kim et al. | 369/112.17 |
| 6,442,124 B1 | * | 8/2002 | Chung et al. | 369/112.07 |

* cited by examiner

*Primary Examiner*—Thang V. Tran
*Assistant Examiner*—Bach Vuong
(74) *Attorney, Agent, or Firm*—Merchant & Gould, P.C.

(57) ABSTRACT

An optical head according to the present invention includes: a first light source for emitting light with a first wavelength; a second light source for emitting light with a second wavelength longer than the first wavelength; and an objective lens for focusing the lights with the first and second wavelengths on information recording surfaces of information recording media corresponding to the lights with the respective wavelengths. The objective lens is designed so as to reduce aberration with respect to the light with the first wavelength. An optical-path length from the second light source to the objective lens is allowed to be shorter than that from the first light source to the objective lens so that aberration caused by the objective lens due to chromatic dispersion caused by a material of the objective lens is reduced with respect to the light with the second wavelength. Thus, using a common optical system, recording and/or reproduction can be carried out with respect to the respective information recording media corresponding to the first and second wavelengths. Furthermore, since the common optical system can be used, the optical head can be simplified in configuration and can be reduced in size.

22 Claims, 13 Drawing Sheets

OPTICAL HEAD AND RECORDING REPRODUCTION METHOD

FIELD OF THE INVENTION

The present invention relates to an optical head provided with a plurality of light sources including a short-wavelength laser source (for emitting a beam with a wavelength between 350 nm and 500 nm), which is used for recording and/or reproduction of an information recording medium such as an optical disk. The present invention also relates to a recording and reproduction method of recording and/or reproduction of an information recording medium using a plurality of light sources including a short-wavelength laser source.

BACKGROUND OF THE INVENTION

FIG. 13 is a structural view of a conventional optical head using a short-wavelength laser source. As a light source used for recording and reproduction of an information recording medium, a short-wavelength laser source (for emitting a beam with a wavelength of 425 nm) is used, which includes a semiconductor laser (for emitting a beam with a wavelength of 850 nm) and an SHG (Second Harmonic Generation) element for shortening the wavelength of an incident beam to half by generating second harmonics. As shown in the figure, a laser beam 103 emitted from a light source including a semiconductor laser 101 and an SHG element 102 for shortening the wavelength of the laser beam emitted from the semiconductor laser 101 to half is converted into parallel light by a collimate lens 104, which is reflected to an information recording medium 109 side by a mirror 106 for guiding light upward and is converted into circularly polarized light by a ¼ wave plate 107. After that, the circularly polarized light is focused on an information recording surface 110 of the information recording medium 109 by an objective lens 108. Then, reflected light from the information recording surface 110 is converted into linearly polarized light whose polarization direction is perpendicular to a polarization direction of the laser beam 103 in an incoming path (a path from the light source to the information recording surface 110) by the ¼ wave plate 107, which is then reflected by a polarization beam splitter 105. After that, the reflected light enters a detection lens 111 and is focused on receiving optics 112, thus detecting a signal.

In a conventional optical head for recording and reproducing a high-density information recording medium using a short-wavelength laser source for emitting a beam with a short wavelength within a range between 350 nm and 500 nm, when a beam with a wavelength of red light and a beam with an infrared wavelength enter the same optical system including an objective lens, an aberration occurs due to chromatic dispersion caused by the material of the objective lens with respect to the beams with such wavelengths. Therefore, with respect to DVDs (with an operating wavelength of about 650 nm), DVD-Rs (with an operating wavelength of about 650 nm), CDs (with an operating wavelength of about 800 nm), CD-Rs (with an operating wavelength of about 800 nm) and CD-RWs (with an operating wavelength of about 800 nm) that use such wavelengths, information cannot be recorded and/or reproduced using the same optical system as that in the above-mentioned optical head, which has been a problem.

SUMMARY OF THE INVENTION

The present invention is intended to solve the above-mentioned problem and to provide an optical head that can record and/or reproduce information using the same optical system with respect to a plurality of information recording media with different specifications employing different operating wavelengths, such as high-density disks (with an operating wavelength of about 350 nm–500 nm), DVDs, DVD-Rs, CDs, CDRs, CD-RWs, and the like. Particularly, the present invention aims to provide a small optical head that is provided with a light source for emitting light with a wavelength between 350 nm and 500 nm and at least one of light sources for emitting light with a wavelength between 600 nm and 700 nm and for emitting light with a wavelength between 700 nm and 900 nm and enables excellent property of focusing the respective lights to be obtained using a common single optical system. The present invention also is intended to provide a recording and reproduction method in which, with respect to a plural kinds of information recording media with different operating wavelengths, information can be recorded and/or reproduced using an optical head provided with a plurality of light sources for emitting lights with different wavelengths and a common single optical system.

In order to achieve the aforementioned objects, the present invention employs the following configurations.

An optical head according to a first configuration of the present invention includes: a first light source for emitting light with a first wavelength; a second light source for emitting light with a second wavelength longer than the first wavelength; and an objective lens for focusing the light with the first wavelength and the light with the second wavelength on information recording surfaces of information recording media corresponding to the lights with the respective wavelengths. The objective lens is designed so as to reduce aberration with respect to the light with the first wavelength. An optical-path length from the second light source to the objective lens is shorter than that from the first light source to the objective lens so that aberration caused by the objective lens due to chromatic dispersion caused by a material of the objective lens is reduced with respect to the light with the second wavelength.

By setting both the optical-path lengths as described above, the aberration caused by the objective lens with respect to the light with the second wavelength can be reduced, thus improving the property of focusing the light with the second wavelength. Therefore, using the same optical system, recording and/or reproduction can be carried out with respect to an information recording medium corresponding to the second wavelength in addition to an information recording medium corresponding to the first wavelength. Furthermore, since a common optical system can be used, the optical head can be simplified in configuration and can be reduced in size.

An optical head according to a second configuration of the present invention includes: a first light source for emitting light with a first wavelength; a second light source for emitting light with a second wavelength longer than the first wavelength; and an objective lens for focusing the light with the first wavelength and the light with the second wavelength on information recording surfaces of information recording media corresponding to the lights with the respective wavelengths. The objective lens is designed so as to reduce aberration with respect to the light with the second wavelength. An optical-path length from the first light source to the objective lens is longer than that from the second light source to the objective lens so that aberration caused by the objective lens due to chromatic dispersion caused by a material of the objective lens is reduced with respect to the light with the first wavelength.

By setting both the optical-path lengths as described above, the aberration caused by the objective lens with respect to the light with the first wavelength can be reduced, thus improving the property of focusing the light with the first wavelength. Therefore, using the same optical system, recording and/or reproduction can be carried out with respect to an information recording medium corresponding to the first wavelength in addition to an information recording medium corresponding to the second wavelength. Furthermore, since a common optical system can be used, the optical head can be simplified in configuration and can be reduced in size.

An optical head according to a third configuration of the present invention includes: a first light source for emitting light with a first wavelength; a second light source for emitting light with a second wavelength longer than the first wavelength; a third light source for emitting light with a third wavelength longer than the second wavelength; and an objective lens for focusing the respective lights with the first, second, and third wavelengths on information recording surfaces of information recording media corresponding to the lights with the respective wavelengths. The objective lens is designed so as to reduce aberration with respect to the light with the first wavelength. Optical-path lengths from the respective second and third light sources to the objective lens are shorter than an optical-path length from the first light source to the objective lens so that the aberration caused by the objective lens due to chromatic dispersion caused by a material of the objective lens is reduced with respect to the respective lights with the second and third wavelengths.

By setting the respective optical-path lengths as described above, the aberration caused by the objective lens with respect to the lights with the second and third wavelengths can be reduced, thus improving the property of focusing lights with the second and third wavelengths. Therefore, using the same optical system, recording and/or reproduction can be carried out with respect to information recording media corresponding to the second and third wavelengths in addition to an information recording medium corresponding to the first wavelength. Furthermore, since a common optical system can be used, the optical head can be simplified in configuration and can be reduced in size.

An optical head according to a fourth configuration of the present invention includes: a first light source for emitting light with a first wavelength; a second light source for emitting light with a second wavelength longer than the first wavelength; a third light source for emitting light with a third wavelength longer than the second wavelength; and an objective lens for focusing the respective lights with the first, second, and third wavelengths on information recording surfaces of information recording media corresponding to the lights with the respective wavelengths. The objective lens is designed so as to reduce aberration with respect to the light with the second wavelength. Optical-path lengths from the respective second and third light sources to the objective lens are shorter than an optical-path length from the first light source to the objective lens so that the aberration caused by the objective lens due to chromatic dispersion caused by a material of the objective lens is reduced with respect to the respective lights with the first and third wavelengths.

By setting the respective optical-path lengths as described above, the aberration caused by the objective lens with respect to the lights with the first and third wavelengths can be reduced, thus improving the property of focusing lights with the first and third wavelengths. Therefore, using the same optical system, recording and/or reproduction can be carried out with respect to information recording media corresponding to the first and third wavelengths in addition to an information recording medium corresponding to the second wavelength. Furthermore, since a common optical system can be used, the optical head can be simplified in configuration and can be reduced in size.

In the first and second optical heads, it is preferable that an aberration correction member for further reducing the aberration caused by the objective lens due to the chromatic dispersion caused by the material of the objective lens is provided in the common optical path from the first and second light sources to an incident plane of the objective lens. According to this, the aberration caused by the objective lens with respect to the lights with the first and second wavelengths can be reduced by inserting the aberration correction member. Thus, the property of focusing the lights with the first and second wavelengths can be further improved.

In the third and fourth optical heads, it is preferable that an aberration correction member for further reducing the aberration caused by the objective lens due to the chromatic dispersion caused by the material of the objective lens is provided in the common optical path at least from the first and second light sources to an incident plane of the objective lens. According to this, the aberration caused by the objective lens at least with respect to the lights with the first and second wavelengths can be reduced by inserting the aberration correction member. Thus, the property of focusing the lights with the first, second, and third wavelengths can be further improved.

In the above, the aberration correction member may be a hologram element for correcting chromatic aberration caused by the objective lens with respect to the light with the first wavelength. According to this, the aberration due to the chromatic dispersion caused by the material of the objective lens with respect to the light with the first wavelength can be reduced, thus improving the focusing property of the objective lens. Further, by using the hologram element, the size of the optical head can be reduced.

Alternatively, in the above, the aberration correction member may be a hologram element for correcting chromatic aberration caused by the objective lens with respect to the light with the second wavelength. According to this, the aberration due to the chromatic dispersion caused by the material of the objective lens with respect to the light with the second wavelength can be reduced, thus improving the focusing property of the objective lens. Further, by using the hologram element, the size of the optical head can be reduced.

In the above, it is preferable that the hologram element is integrally formed on a surface of the objective lens. According to this, the optical system including the lens and the hologram element can be reduced in weight and size, thus reducing the load on an actuator for actuating the lens.

Further, in the first and second optical heads, the aberration correction member may be a collimate lens for converting divergent light from the first or second light source substantially into parallel light. According to this, the tolerance for positioning accuracy of the objective lens can be increased in a plane perpendicular to an optical axis of light that has been converted into parallel light by the collimate lens out of the divergent lights from the first and second light sources.

Similarly, in the third and fourth optical heads, the aberration correction member may be a collimate lens for converting divergent light from the first, second, or third light source substantially into parallel light. According to this, the tolerance for positioning accuracy of the objective lens can be increased in a plane perpendicular to an optical axis of light that has been converted into parallel light by the collimate lens out of the divergent lights from the first, second, and third light sources.

In this case, the light emitted from the third light source may be allowed to enter the objective lens directly without passing through the collimate lens. According to this, recording and/or reproduction of a plurality of optical disks with different specifications, such as, for example, high-density optical disks, DVDs, DVD-Rs, CDs, CD-Rs, or CD-RWs, can be carried out easily in the same optical system.

Further, the aberration correction member may be a collimate lens designed to cause aberration so as to reduce the aberration caused by the objective lens due to the chromatic dispersion caused by the material of the objective lens. In other words, the collimate lens is allowed to cause aberration intentionally so as to cancel or reduce the chromatic aberration caused by the objective lens. As a result, the aberration in the optical system as a whole can be further reduced.

In the third or fourth optical head, it is preferable that the optical-path length between the third light source and the objective lens is set so that the NA (numerical aperture) of the objective lens is 0.5 or less with respect to the light with the third wavelength. According to this, recording and/or reproduction can be carried out easily with respect to information recording media, such as, for example, CDs, CD-Rs, or CD-RWs.

In the above-mentioned first to fourth optical heads, it is preferable that an Abbe number of the material of the objective lens is different from that of a material of the aberration correction member so that the aberration caused by the objective lens due to the chromatic dispersion caused by the material of the objective lens is reduced. According to this, the chromatic aberration caused by the objective lens can be compensated by the aberration correction member.

In the above-mentioned first to fourth optical heads, it is preferable that the Abbe number of the material of the objective lens is at least 55. By using a material causing less chromatic dispersion as a material of the objective lens, the chromatic aberration caused by the objective lens can be reduced.

In the above-mentioned first to fourth optical heads, the objective lens may be a single aspherical lens designed so as to correct aberration with respect to light with any one of the wavelengths. According to this, wavefront aberration easily can be reduced simply by arranging the respective light sources so as to vary the optical-path lengths between the respective light sources and the objective lens so that aberration caused by the objective lens with respect to lights that are not subjected to the aberration correction in the objective lens can be reduced.

Alternatively, in the above-mentioned first to fourth optical heads, the objective lens may be a combination lens formed of spherical or aspherical lenses in which chromatic aberration and wavefront aberration are corrected with respect to the lights with the respective wavelengths. According to this, wavefront aberration easily can be reduced simply by arranging the respective light sources so as to vary the optical-path lengths between the respective light sources and the objective lens.

In the above-mentioned first or second optical head, it is preferable that the first and second light sources emit light selectively. According to this, recording and/or reproduction can be carried out with respect to information recording surfaces of different information recording media corresponding to two different wavelengths.

In the above-mentioned third or fourth optical head, it is preferable that the first, second, and third light sources emit light selectively. According to this, recording and/or reproduction can be carried out with respect to information recording surfaces of different information recording media corresponding to three different wavelengths.

In the above-mentioned first or second optical head, it is preferable that the first wavelength is in a range between 350 nm and 500 nm and the second wavelength is in a range between 600 nm and 700 nm. According to this, using the same optical head, recording and/or reproduction can be carried out with respect to a plurality of optical disks with different specifications, such as high-density disks, DVDs, DVD-Rs, or the like.

In the above-mentioned third or fourth optical head, it is preferable that the first wavelength is in a range between 350 nm and 500 nm, the second wavelength in a range between 600 nm and 700 nm, and the third wavelength in a range between 700 nm and 900 nm. According to this, using the same optical head, recording and/or reproduction can be carried out with respect to a plurality of optical disks with different specifications, such as high-density optical disks, DVDs, DVD-Rs, CDs, CD-Rs, CD-RWs, or the like.

A recording and reproduction method according to the present invention is a method in which, with respect to information recording media having information recording surfaces and protective layers thereon, information is recorded on and/or reproduced from the information recording surfaces by projecting light on the information recording media from the side of the protective layers. In the method, an optical head is used, which includes: a first light source for emitting light with a first wavelength; a second light source for emitting light with a second wavelength longer than the first wavelength; and an objective lens for focusing the light with the first wavelength and the light with the second wavelength on the information recording surfaces of information recording media corresponding to the lights with respective wavelengths. The objective lens used is designed so as to reduce aberration with respect to the light with the second wavelength. The thickness of the protective layer on the information recording surface corresponding to the light with the first wavelength is allowed to be different from that of the protective layer on the information recording surface corresponding to the light with the second wavelength so that aberration caused by the objective lens due to chromatic dispersion caused by a material of the objective lens is reduced with respect to the light with the first wavelength.

By varying the thickness of the protective layers in the information recording media depending on the wavelengths of lights emitted from the light sources used, chromatic aberration caused by the objective lens can be reduced. As a result, using the same optical system, recording and/or reproduction can be carried out with respect to a plurality of information recording media with different operating wavelengths. Since a common optical system can be used, the optical head can be simplified in configuration and can be reduced in size.

In the aforementioned recording and reproduction method, it is preferable that the lights with the first and second wavelengths entering the objective lens are substantially parallel lights, the protective layer on the information recording surface corresponding to the light with the second wavelength has a thickness in a range of 0.55 mm to 0.65 mm, and the protective layer on the information recording surface corresponding to the light with the first wavelength has a thickness in a range of 0.65 mm to 0.75 mm. According to this, recording and/or reproduction can be carried out with respect to the information recording surfaces of the different information recording media corresponding to the respective first and second wavelengths. In addition, by using the parallel lights, the tolerance for positioning accuracy of the objective lens can be increased in a plane perpendicular to an optical axis.

In the aforementioned recording and reproduction method, it is preferable that an Abbe number of the protective layer on the information recording surface corresponding to the light with the first wavelength is allowed to be different from that of the protective layer on the information recording surface corresponding to the light with the second wavelength so that the aberration caused by the objective lens due to the chromatic dispersion caused by the material of the objective lens is further reduced with respect to the first wavelength. By varying the Abbe numbers of the protective layers in the information recording media depending on the wavelengths of lights emitted from the light sources used, the chromatic aberration caused by the objective lens can be further reduced.

In the aforementioned recording and reproduction method, as the information recording media, an information recording medium with a two-layer structure may be used, which includes: a first information recording surface corresponding to the light with the first wavelength; a second information recording surface corresponding to the light with the second wavelength; and first and second protective layers formed on the respective first and second information recording surfaces. Recording and/or reproduction may be carried out by projecting lights on each of the information recording surfaces from the same side, and the thickness of the first protective layer may be set so that chromatic aberration caused by the objective lens due to the chromatic dispersion caused by the material of the objective lens is reduced with respect to the light with the first wavelength. By varying the thickness of the protective layers in the information recording medium depending on the wavelengths of lights emitted from the light sources used, chromatic aberration caused by the objective lens can be reduced. Furthermore, by designing an information recording medium so as to have a two-layer structure, the recording capacity of the information recording medium itself can be increased.

In the aforementioned recording and reproduction method, as the information recording media, an information recording medium with a four-layer structure also may be used, which is obtained by bonding lamination units together by their information recording surface sides. Each of the lamination units is formed of a first information recording surface corresponding to the light with the first wavelength, a second information recording surface corresponding to the light with the second wavelength, and first and second protective layers formed on the respective first and second information recording surfaces. In the information recording medium, recording and/or reproduction can be carried out by projecting lights from both sides. By using the information recording medium for two-sided recording or reproduction that is obtained by bonding the information recording media with the two-layer structure by their information recording surface sides, the recording capacity of the information recording medium itself can be further increased.

In the aforementioned recording and reproduction method, it is preferable that the first wavelength is in a range between 350 nm and 500 nm and the second wavelength is in a range between 600 nm and 700 nm. According to this, using the same optical head, recording and/or reproduction of a plurality of optical disks with different specifications, such as high-density optical disks, DVDs, DVD-Rs, or the like, can be carried out.

DETAILED DESCRIPTION OF THE INVENTION

The present invention is described with reference to the drawings as follows.

First Embodiment

Figure 1:
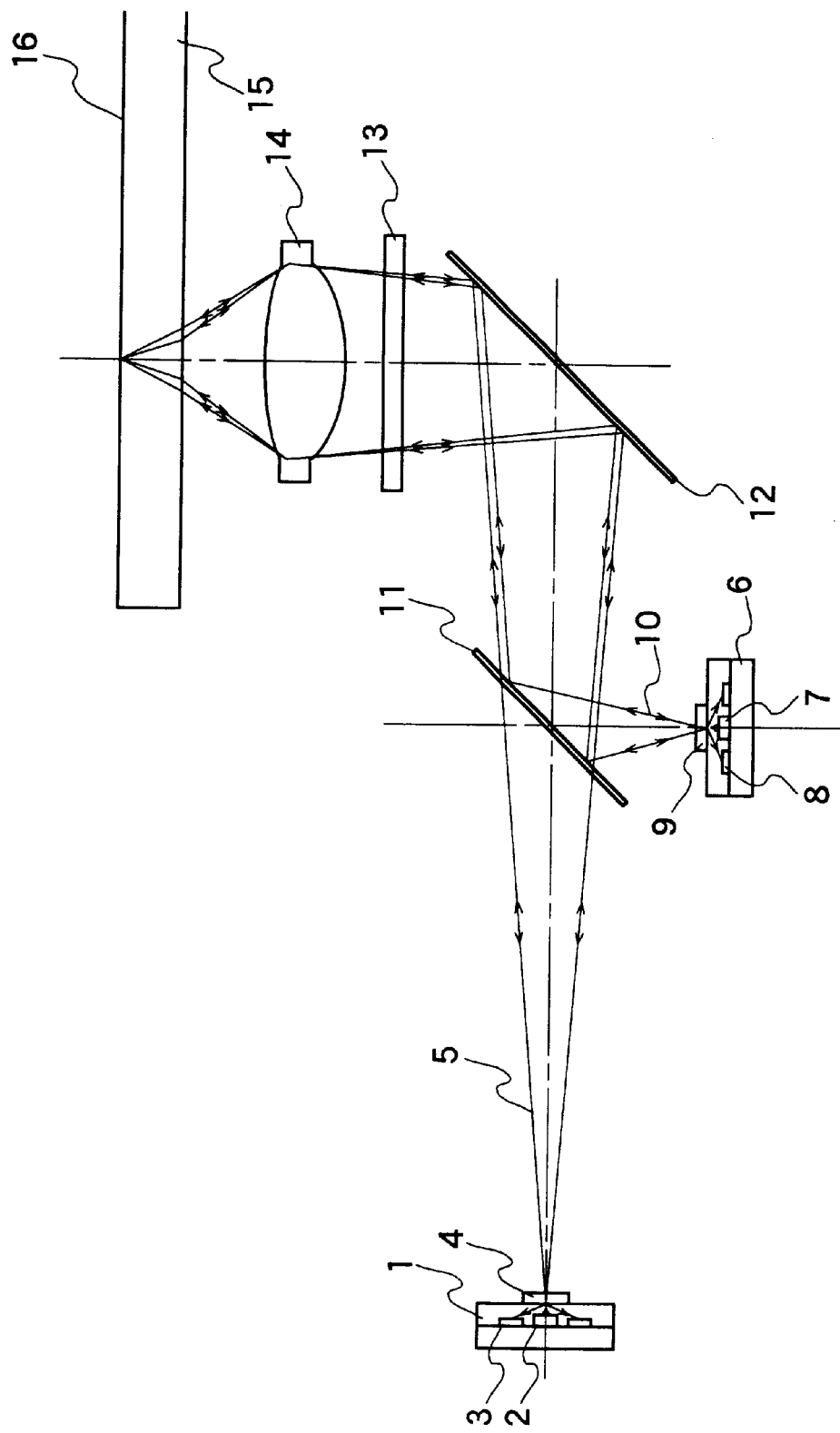
FIG. 1 is a structural view of an optical head according to a first embodiment of the present invention.

FIG. 1 is a structural view of an optical head according to a first embodiment of the present invention.

This optical head includes a first light source 2 for emitting light with a first wavelength within a range between 350 nm and 500 nm, for example a first wavelength of 400 nm, and a second light source 7 for emitting light with a second wavelength within a range between 600 nm and 700 nm, for example a second wavelength of 660 nm. The first light source 2 is integrated together with first receiving optics 3 and a first hologram element 4 to form a first LD/PD (laser diode/photo detector) module 1. Similarly, the second light source 7 is integrated together with second receiving optics 8 and a second hologram element 9 to form a second LD/PD (laser diode/photo detector) module 6. Through selective switching between the first light source 2 and the second light source 7, information is recorded or reproduced with respect to information recording media corresponding to the respective wavelengths. An information recording medium has an information recording surface 16 on which digital information is recorded and a protective layer 15 provided on the side on which light is incident. Practically, a first information recording medium corresponding to the first wavelength and a second information recording medium corresponding to the second wavelength are present as information recording media. In the present embodiment, however, since the protective layers of both the information recording media have the same thickness, the information recording media are shown in FIG. 1 without being distinguished from each other.

First, outgoing light 5 from the first light source 2 passes through a beam splitter 11. On the other hand, second outgoing light 10 from the second light source 7 is reflected in an orthogonal direction by the beam splitter 11 so as to travel in the same direction and on the same optical axis as those of the first outgoing light 5. Then, the first outgoing light 5 and the second outgoing light 10 are deflected in a direction substantially perpendicular to the information recording surfaces 16 of the information recording media by a mirror 12 for guiding light upward. After that, the first outgoing light 5 and the second outgoing light 10 are converted into circularly polarized lights by a ¼ plate 13, which are then focused on the information recording surfaces 16 by an objective lens 14, thus recording and reproducing digital information. Respective reflected lights from the information recording surfaces 16 of the first and second light sources are converted into linearly polarized lights with polarization directions perpendicular to those of the first and second outgoing lights 5 and 10 by the ¼ plate 13. Then, the respective linearly polarized lights are diffracted by the first hologram element 4 and the second hologram element 9 and are focused on the surfaces of the first receiving optics 3 and the second receiving optics 8. Thus, reproduction signals of digital information and focus/tracking signals of signals for controlling the position of the objective lens are detected.

Figure 2:
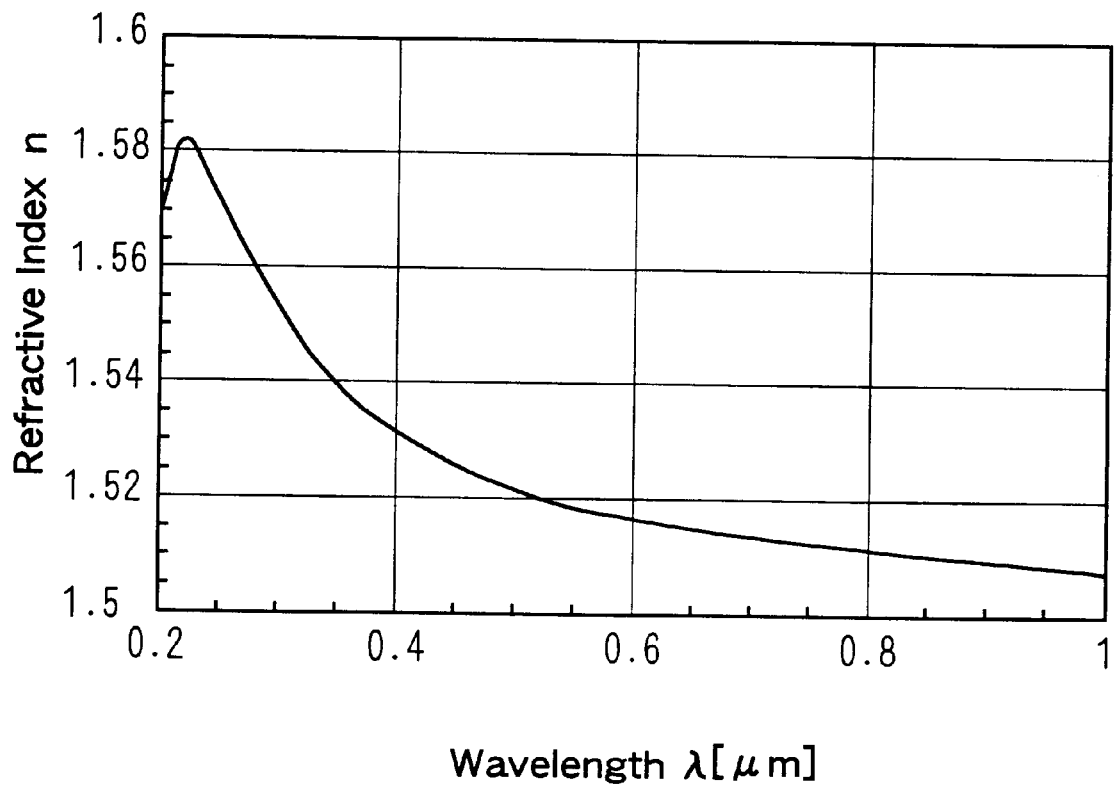
FIG. 2 is a graph showing the wavelength dependence of a refractive index in a glass material (BK-7).

The present inventors found that in the optical system with the above-mentioned configuration, generally the refractive index of glass materials of optical components increases abruptly (i.e. chromatic dispersion becomes greater) when the wavelength of light is below about 500 nm as shown in FIG. 2 (showing the case of a glass material BK-1 that is commonly used).

For example, suppose a single aspherical lens is used as the objective lens 14, which is designed so as to focus light with the first wavelength excellently. In this case, for the above-mentioned reason, with respect to the light with the second wavelength, the refractive index of the objective lens 14 deviates from a design value greatly. Consequently, when the optical-path length from the second light source 7 to the objective lens 14 is substantially equal to that from the first light source 2 to the objective lens 14, the second outgoing light 10 cannot be focused at an image point of the objective lens 14 well, i.e. chromatic aberration due to the chromatic dispersion caused by the glass material of the objective lens 14 occurs with respect to the light with the second wavelength, which is a problem. The present inventors found that the chromatic aberration caused by the objective lens 14 with respect to the light with the second wavelength can be reduced by arranging the first and second light sources 2 and 7 so that the optical-path length from the second light source 7 to the objective lens 14 is shorter than that from the first light source 2 to the objective lens 14. The optical-path lengths were able to be optimized so that actually the amount of the chromatic aberration did not cause any substantial problem, for example, so that a wavefront aberration was 0.04λ (λ represents a wavelength) or less as an RMS value.

Further, in the case where a single aspherical lens is used as the objective lens 14, which is designed so as to focus light with the second wavelength excellently, when the optical-path length from the first light source 2 to the objective lens 14 is substantially equal to that from the second light source 7 to the objective lens 14, the chromatic aberration due to the chromatic dispersion caused by the glass material of the objective lens 14 occurs with respect to the light with the first wavelength, thus deteriorating the focusing property. In this case, in order to reduce the aberration caused by the objective lens 14, the first and second light sources 2 and 7 are arranged so that the optical-path length from the first light source 2 to the objective lens 14 is longer than that from the second light source 7 to the objective lens 14. Thus, the amount of the chromatic aberration with respect to the light with the first wavelength can be decreased to cause no substantial problem.

In addition, as the material of the objective lens 14, by using a material causing less chromatic dispersion (a material having a large Abbe number that indicates the degree of chromatic dispersion) having an Abbe number of, for example, at least 55, such as CaFK95 (with an Abbe number of 95.0), GFK70 (with an Abbe number of 71.3), P-BK40 (with an Abbe number of 63.5), or VC79 (with an Abbe number of 57.8), the chromatic aberration caused by the objective lens 14 can be further reduced. Specifically, the amount of the chromatic aberration can be reduced so that values excellent enough are obtained with margin characteristics also being taken into consideration, for example, a wavefront aberration of 0.03λ or less is obtained in the optical system.

Second Embodiment

Figure 3:
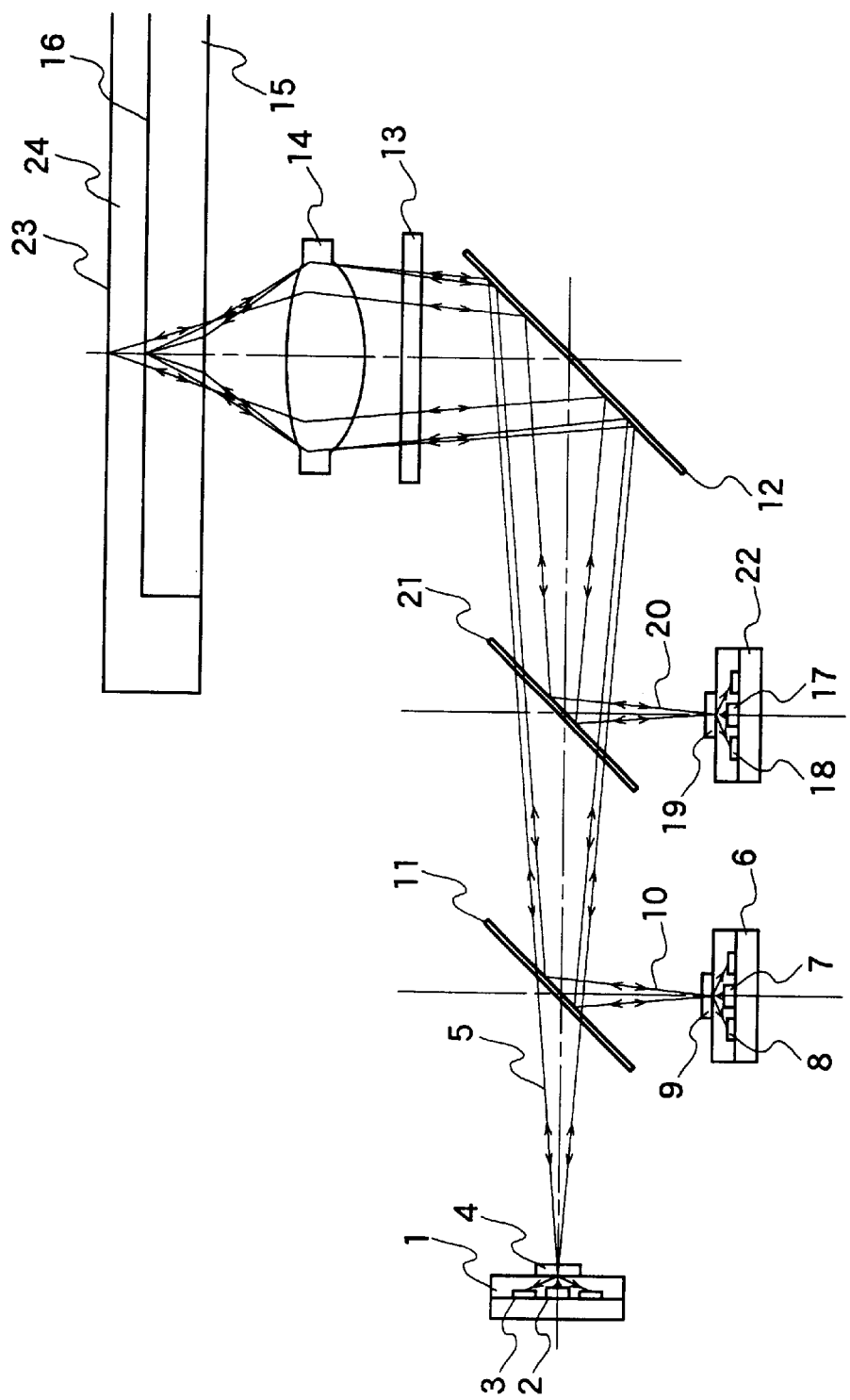
FIG. 3 is a structural view of an optical head according to a second embodiment of the present invention.

FIG. 3 is a structural view of an optical head according to a second embodiment of the present invention. In FIG. 3, components having the same functions as those of the components shown in FIG. 1 are indicated with the same numerals and their detailed descriptions are not repeated.

In this embodiment, a third light source 17 is further provided, which emits light with a third wavelength within a range between 700 nm and 900 nm, for example, a third wavelength of 800 nm. The third light source 17 is integrated together with third optics 18 and a third hologram element 19 to form a third LD/PD (laser diode/photo detector) module 22.

Light with the third wavelength is irradiated onto an information recording surface 23 of a third information recording medium corresponding to the third wavelength and thus digital information is recorded and/or reproduced thereon. A protective layer 24 in the information recording medium corresponding to the third wavelength has a thickness different from that of the protective layer 15 in the information recording medium corresponding to the first or second wavelength. Through selective switching among the first to third light sources, information can be recorded and/or reproduced with respect to the information recording media corresponding to the respective wavelengths.

Third outgoing light 20 from the third light source 17 is reflected in an orthogonal direction by a beam splitter 21 so as to travel in the same direction and on the same optical axis as those of the first outgoing light 5. After that, the reflected light travels along the same path as that of the first and second outgoing lights 5 and 10 and is focused on the information recording surface 23. Reflected light from the information recording surface 23 is converted into linearly polarized light with a polarization direction perpendicular to that of the outgoing light 20 from the third light source 17 by a ¼ plate 13. Then the linearly polarized light is diffracted by the third hologram element 19, which is then focused on the surface of the third receiving optics 18.

When an objective lens designed so as to focus lights with the first or second wavelengths excellently is used as the objective lens 14, with respect to the light with the third wavelength, aberration occurs due to the differences in wavelength and in thickness of the protective layer 24 in the third information recording medium corresponding to the third wavelength, thus deteriorating the focusing property. In the present embodiment, in order to reduce such aberration, the first, second, and third light sources 2, 7, 17 are arranged so that the optical-path length from the third light source 17 to the objective lens 14 is shorter than that from the first light source 2 or the second light source 7 to the objective lens 14. As a result, the amount of the aberration can be decreased to cause no substantial problem.

The aspects other than the above are the same as in the first embodiment.

Third Embodiment

Figure 4:
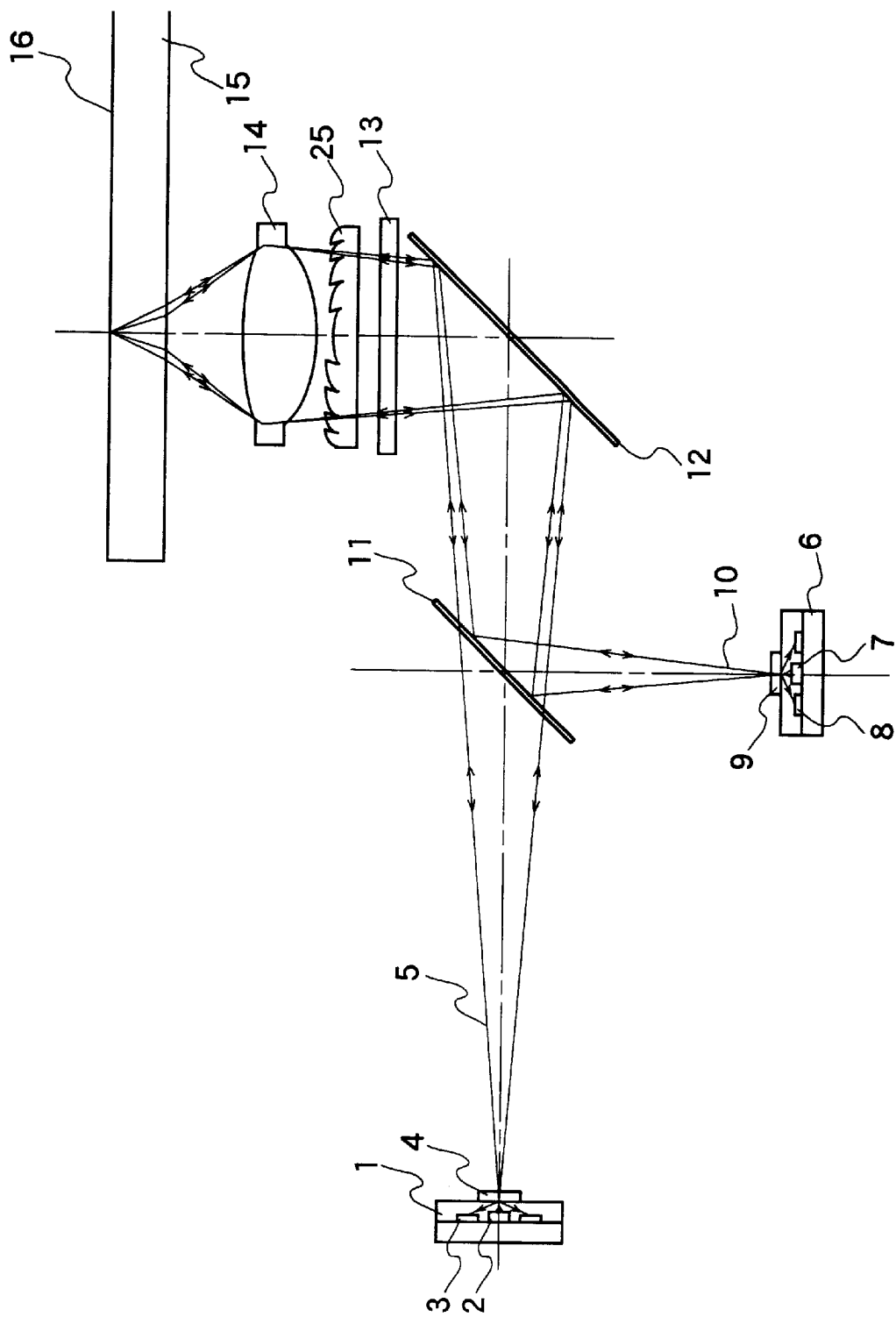
FIG. 4 is a structural view of an optical head according to a third embodiment of the present invention.

FIG. 4 is a structural view of an optical head according to a third embodiment of the present invention. In FIG. 4, components having the same functions as those of the components shown in FIG. 1 are indicated with the same numerals and their detailed descriptions are not repeated.

In this embodiment, an aberration correction member 25 is provided in a common optical path from a first light source 2 and a second light source 7 to an incident plane of an objective lens 14 to further reduce aberration caused by the objective lens 14 due to chromatic dispersion caused by a glass material of the objective lens 14 with respect to light with a first wavelength or a second wavelength. As the aberration correction member 25, for example, a hologram element can be used.

In an optical head, a laser source may generate noise due to return light from an information recording medium or the like. Therefore, oscillation is caused at a plurality of wavelengths in the vicinity of the center wavelength by applying high frequency (multimode oscillation) to widen the wavelength range, thus stabilizing an oscillation state in many cases. However, the widening of the wavelength range in the laser source causes aberration due to chromatic dispersion caused by a glass material of an objective lens, thus deteriorating the focusing property, which is a problem. Further, when a hologram element is inserted on a side of the incident plane of the objective lens, an angle of diffraction of outgoing light from the hologram element is varied due to the variation in wavelength of incident light and therefore light cannot be focused excellently at a focal point of the objective lens, thus causing chromatic aberration, which also is a problem.

In the present embodiment, the optical system is designed so as to reduce both the chromatic aberration due to the widening of the wavelength range in the laser sources and the chromatic aberration due to the variation in angle of diffraction (i.e. to allow them to cancel each other out). Thus, it is possible to further reduce the aberration caused by a widened wavelength range when the first light source 2 or the second light source 7 is oscillated in a multimode by superimposing high frequencies.

Figure 5:
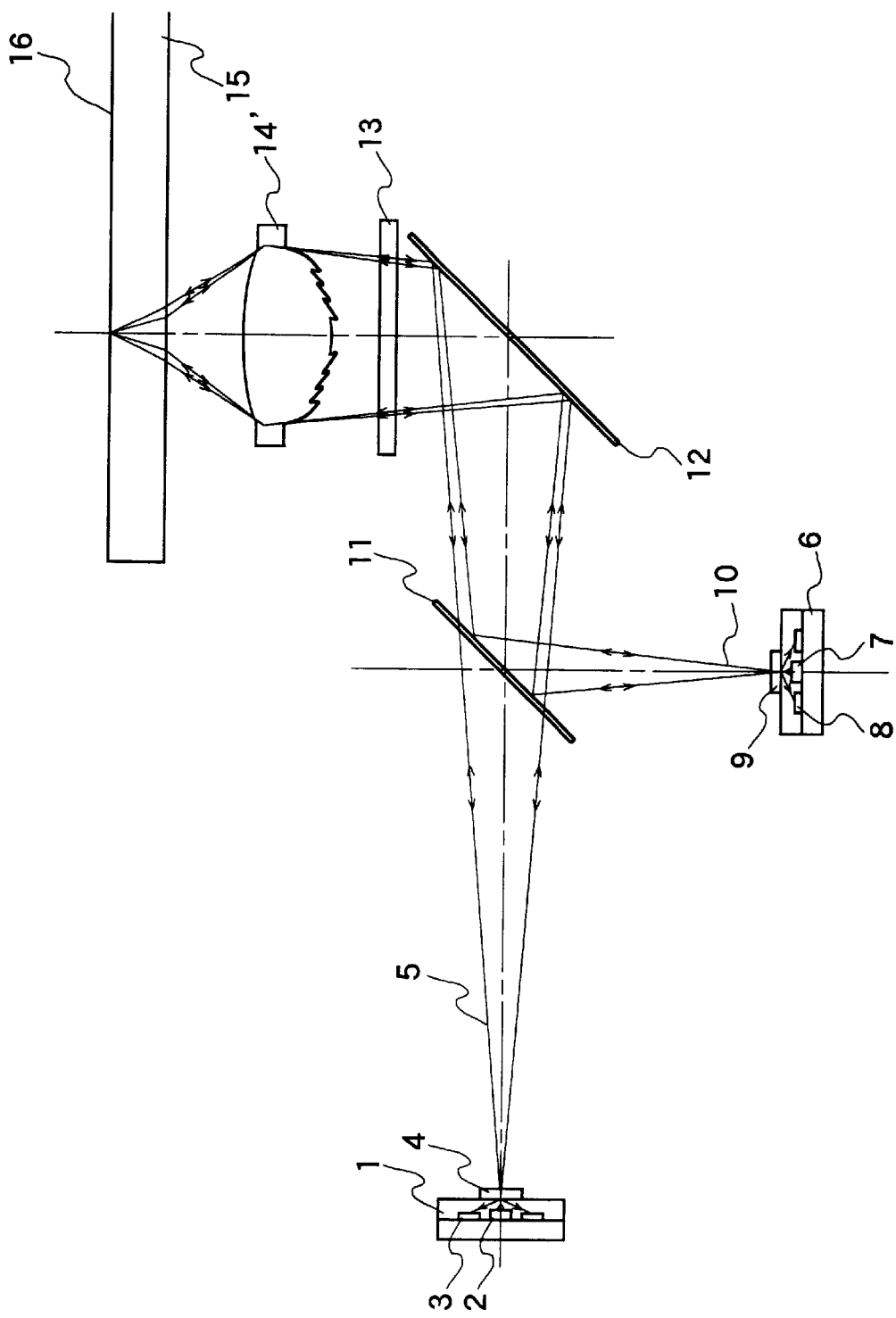
FIG. 5 is a structural view of another optical head according to a third embodiment of the present invention.

In FIG. 4, the aberration correction member (hologram element) 25 is shown as an independent component. However, as shown in FIG. 5, an objective lens 14' formed integrally with a hologram element also can be used. By employing the objective lens 14' provided with a function for correcting chromatic aberration, the number of components and the number of assembly steps can be reduced.

This embodiment also can be applied to the optical head having a third light source as in the second embodiment.

The aspects other than the above are the same as those in the first and second embodiments.

Fourth Embodiment

Figure 6:
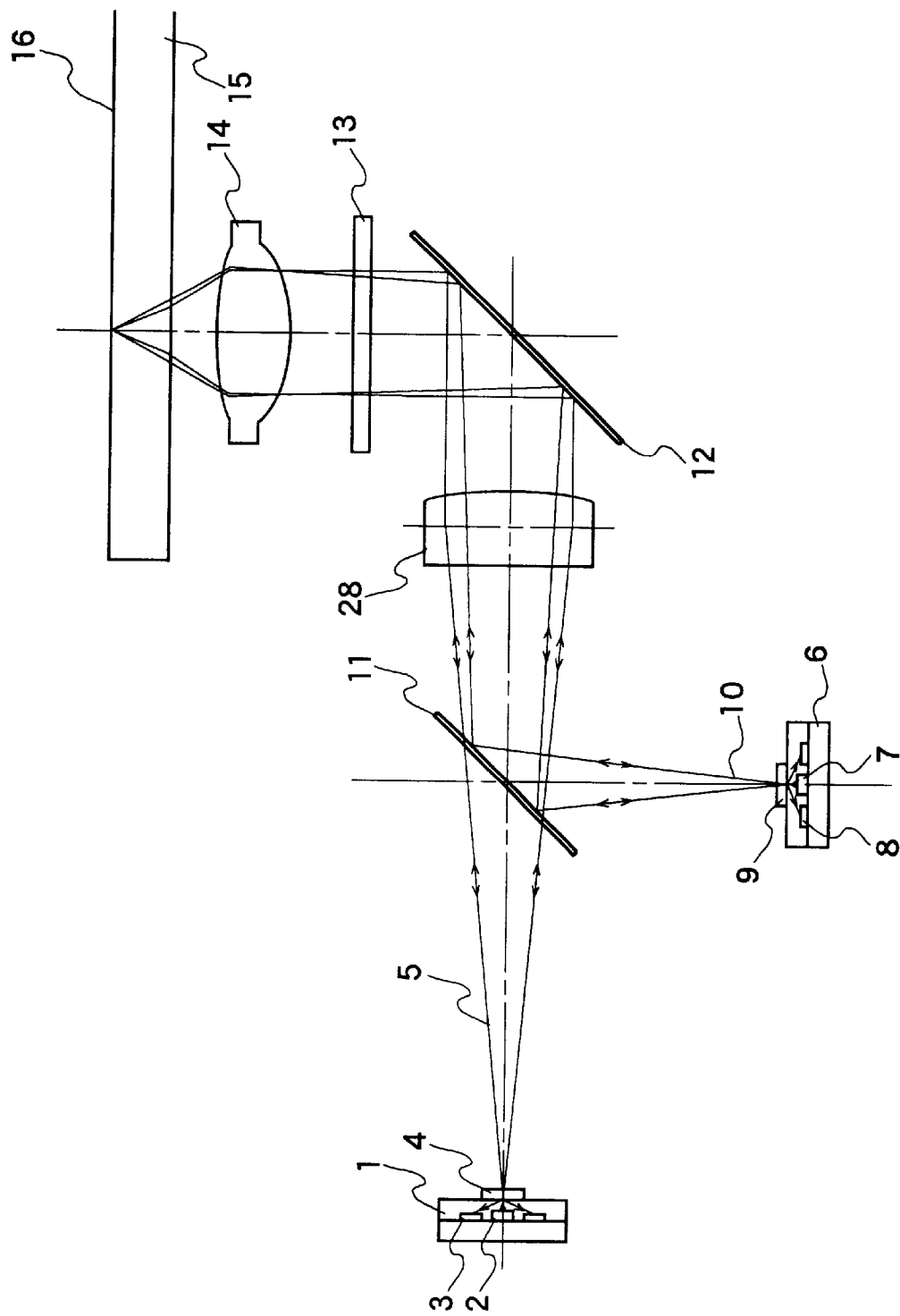
FIG. 6 is a structural view of an optical head according to a fourth embodiment of the present invention.

FIG. 6 is a structural view of an optical head according to a fourth embodiment of the present invention. In FIG. 6, components having the same functions as those of the components shown in FIG. 1 are indicated with the same numerals and their detailed descriptions are not repeated.

In the present embodiment, a collimate lens 28 for converting divergent light from a first light source 2 or a second light source 7 substantially into parallel light is disposed in a common optical path from the first light source 2 and the second light source 7 to an incident plane of an objective lens 14. The objective lens 14 is designed so as to excellently focus light from one of the first light source 2 and the second light source 7, which emits divergent light, to be collimated to parallel light. In this case, the aberration is caused by the objective lens 14 due to chromatic dispersion caused by a glass material of the objective lens 14 with respect to a wavelength of light from the light source for emitting light not to be collimated. In addition, chromatic aberration and spherical aberration are caused by the collimate lens 28 with respect to that wavelength. In the present embodiment, as in the first and second embodiments, the light sources are arranged so that the optical-path length from the light source for emitting light not to be collimated to the objective lens 14 is different from that from the light source for emitting light to be collimated to the objective lens 14. Thus, those aberrations can be reduced. Furthermore, the tolerance for positioning accuracy of the objective lens 14 can be increased in a plane perpendicular to an optical axis with respect to the light source for emitting light to be collimated.

In this case, for instance, by allowing Abbe numbers of the glass materials of the collimate lens 28 and the objective lens 14 to be different from each other, or by designing the collimate lens 28 in various shapes using various materials, aberrations are caused intentionally by the collimate lens 28, thus reducing (canceling) the chromatic aberration caused by the objective lens 14 by virtue of the chromatic aberration caused by the collimate lens 28. Consequently, the aberration in the optical system as a whole can be further reduced.

The following description is directed to a specific structural example. For instance, semiconductor lasers for emitting lights with wavelengths of 410 nm and 650 nm are used as a first light source 2 and a second light source 7 shown in FIG. 6, respectively. The respective light sources are arranged so that the optical-path lengths from the first light source 2 and the second light source 7 to an incident plane of a collimate lens 28 with a focal length of 20 mm are 20 mm and 16.7 mm, respectively. Outgoing light 5 from the first light source 2 and outgoing light 10 from the second light source 7 are converted into parallel light and divergent light by the collimate lens 28 respectively, which are allowed to enter an objective lens 14 that is formed using FCD100 (with an Abbe number of 95) as its glass material. The optical system is designed so that the objective lens 14 has the numerical apertures (NA) of 0.7 and 0.6 with respect to the light emitted from the first light source 2 and the light emitted from the second light source 7, respectively. Using an optical head thus designed, recording and/or reproduction can be carried out with respect to a high-density disk for a wavelength of 410 nm and an information recording medium for DVD for a wavelength of 650 nm, both of which have protective layers with a thickness of 0.6 mm.

Figure 7:
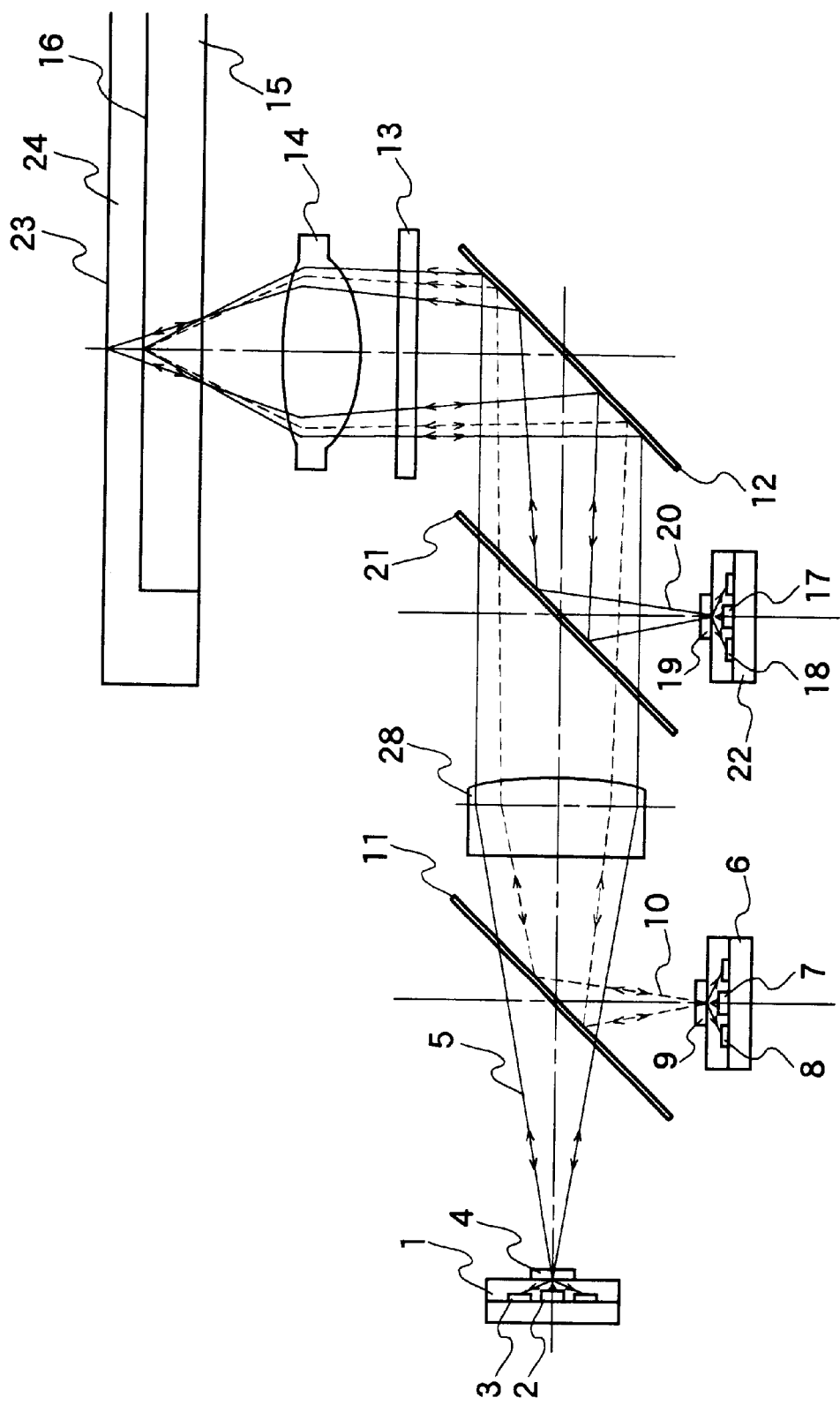
FIG. 7 is a structural view of another optical head according to the fourth embodiment of the present invention.

Furthermore, as shown in FIG. 7, a third light source 17 for emitting light with a wavelength of 800 nm is disposed so that the light does not pass through the collimate lens 28. The optical system is designed so that the objective lens 14 has a numerical aperture of 0.45 with respect to the light from the third light source 17. Using the optical head thus designed, recording and/or reproduction can be carried out further with respect to an information recording medium, such as CD, CD-R, or CD-RW, having a protective layer 24 with a thickness of 1.2 mm. In FIG. 7, components having the same functions as those of the components shown in FIG. 3 are indicated with the same numerals and their detailed descriptions are not repeated.

Figure 8:
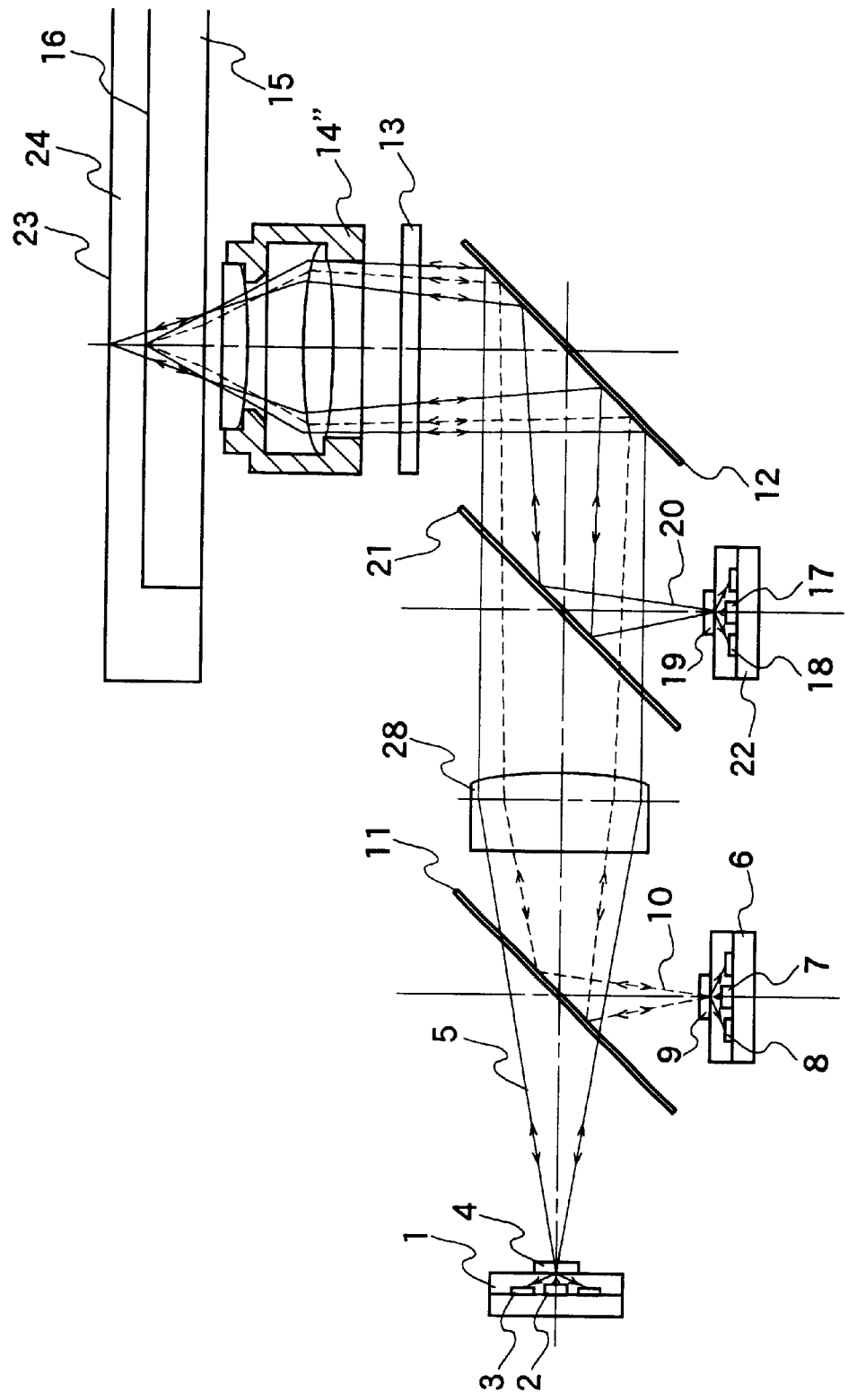
FIG. 8 is a structural view of still another optical head according to the fourth embodiment of the present invention.

As shown in FIG. 8, a combination lens 14" including a plurality of aspherical or spherical lenses can be used as an objective lens. In this case, the combination lens 14" is designed so as to correct the chromatic aberration and wavefront aberration with respect to the respective wavelengths of lights emitted from the first, second, and third light sources. According to such a configuration, the aberration caused by the objective lens 14 can be further reduced, thus improving the focusing property of the optical system. In FIG. 8, components having the same functions as those of the components shown in FIG. 7 are indicated with the same numerals and their detailed descriptions are not repeated.

Figure 9:
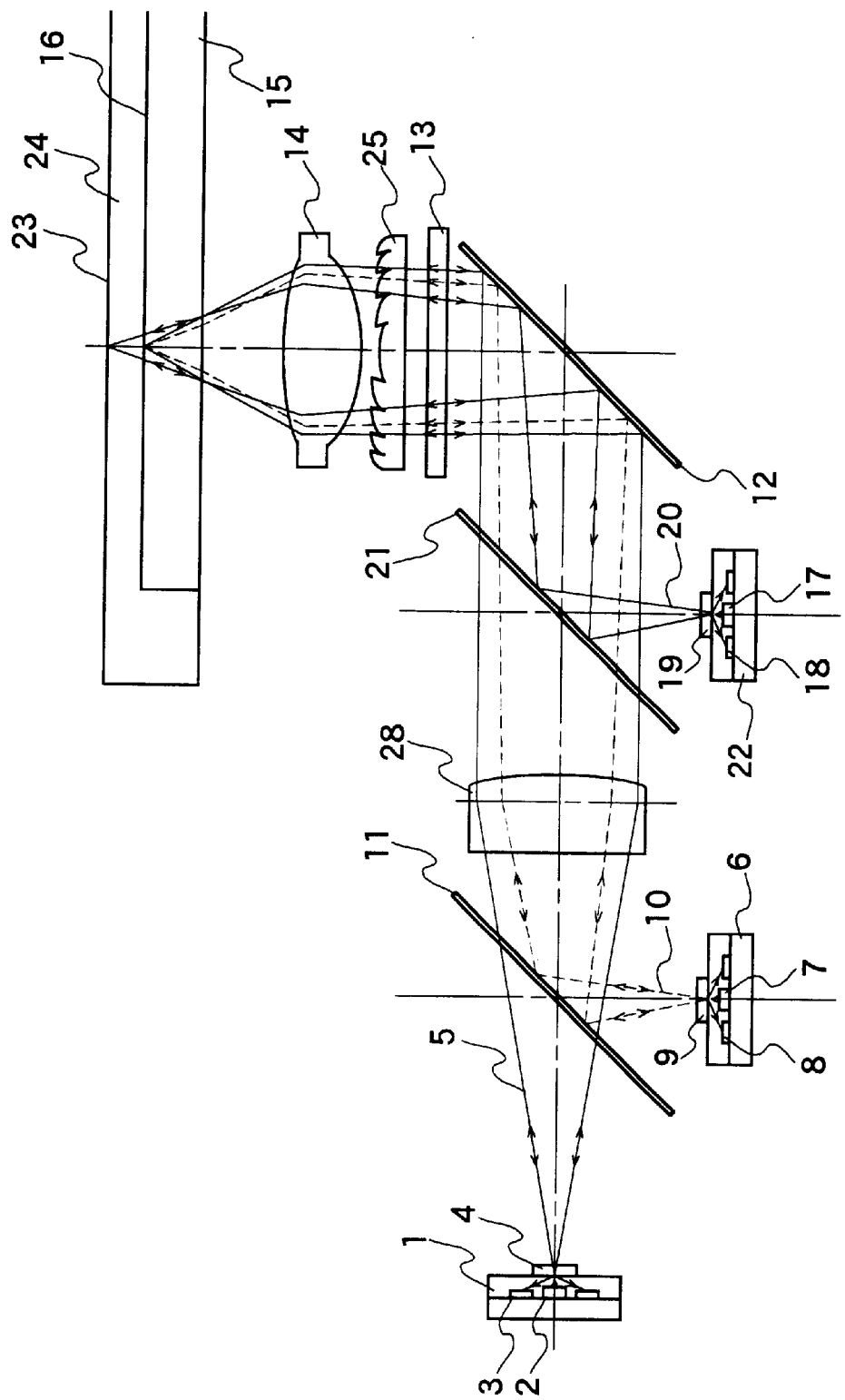
FIG. 9 is a structural view of yet another optical head according to the fourth embodiment of the present invention.

In addition, as shown in FIG. 9, an aberration correction member (a hologram element) 25 also can be inserted in a common optical path from a first light source 2, a second light source 7, and a third light source 17 to an incident plane of an objective lens 14 as in the third embodiment. According to such a configuration, aberration caused by the objective lens 14 can be reduced, thus improving the focusing property of the optical system. In FIG. 9, components having the same functions as those of the components shown in FIG. 7 are indicated with the same numerals and their detailed descriptions are not repeated.

The aspects other than the above are the same as those in the first, second, and third embodiments.

Fifth Embodiment

Figure 10:
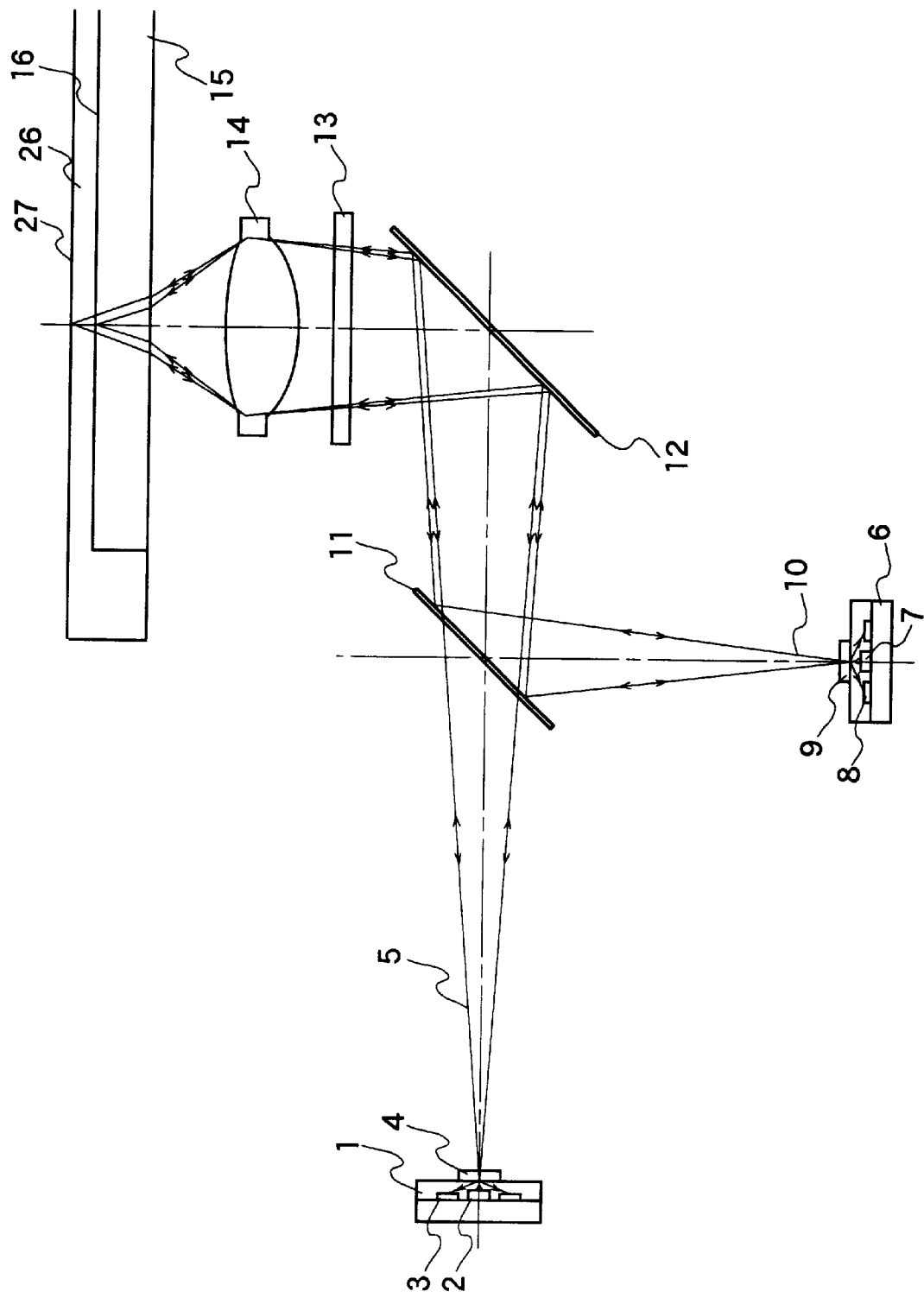
FIG. 10 is a structural view illustrating a recording and reproduction method according to a fifth embodiment of the present invention.

FIG. 10 is a view for explaining a recording and reproduction method according to a fifth embodiment of the present invention. In FIG. 10, components having the same functions as those of the components shown in FIG. 1 are indicated with the same numerals and their detailed descriptions are not repeated.

An objective lens 14 is designed so as to reduce aberration with respect to a wavelength of light emitted from a second light source 7. In the aforementioned first embodiment, the protective layers in the information recording media corresponding to the respective first and second wavelengths had the same thickness. On the other hand, in the present embodiment, the thickness of a protective layer in a first information recording medium corresponding to the first wavelength is set so that the aberration due to chromatic dispersion caused by a glass material of the objective lens 14 with respect to the wavelength of light from the first light source 2 is reduced. Specifically, in order to reduce the aberration caused in the optical system from the first light source 2 to the objective lens 14, the thickness of a protective layer 26 on an information recording surface 27 of a first information recording medium corresponding to the wavelength of light emitted from the first light source 2 is allowed to be different from the thickness of a protective layer 15 on an information recording surface 16 of a second information recording medium corresponding to the wavelength of light emitted from the second light source 7. Thus, aberration is caused intentionally by allowing the protective layer 26 to have a thickness different from that of the protective layer 15, thus reducing the aberration in the optical system as a whole.

Furthermore, an Abbe number of the protective layer 26 may be allowed to be different from that of the protective layer 15. In other words, aberration is caused intentionally by setting the Abbe number of the protective layer 26 suitably, thus reducing the aberration caused by the objective lens 14 with respect to the first wavelength to some degree.

The aspects other than the above are the same as those in the first, second, third, and fourth embodiments.

Figure 11:
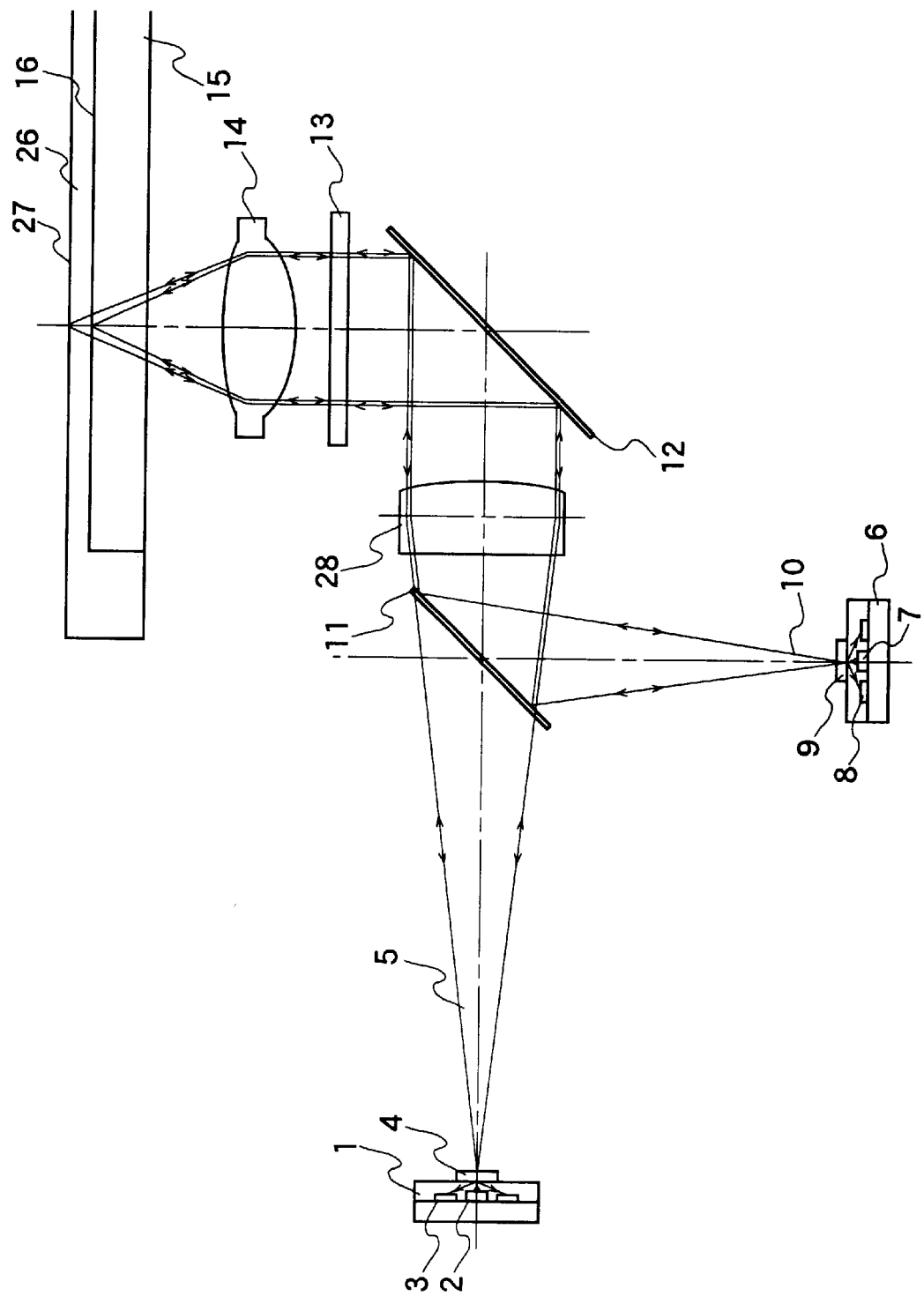
FIG. 11 is a structural view illustrating another recording and reproduction method according to a fifth embodiment of the present invention.

The following description is directed to a specific structural example. As shown in FIG. 11, semiconductor lasers for emitting lights with wavelengths of 410 nm and 650 nm are used as a first light source 2 and a second light source 7, respectively. A collimate lens 28 is disposed in a common optical path from the first and second light sources 2 and 7 to an objective lens 14. The first and second light sources 2 and 7 are arranged so as to have the same optical-path length to the collimate lens 28. Outgoing light 5 from the first light source 2 and outgoing light 10 from the second light source 7 are converted into approximately parallel lights by the collimate lens 28. The objective lens 14 is designed so as to reduce aberration with respect to the wavelength of the light emitted form the second light source 7. The protective layer 26 in a first information recording medium corresponding to the first light source has a thickness of 0.7 mm and a protective layer 15 in a second information recording medium corresponding to the second light source has a thickness of 0.6 mm. The optical system is arranged so that a numerical aperture of the objective lens 14 is 0.6 with respect to both the lights from the first light source 2 and the second light source 7. Thus, recording and/or reproduction can be carried out with respect to a high-density disk having a protective layer with a thickness of 0.7 mm for a wavelength of 410 nm and a DVD having a protective layer with a thickness of 0.6 mm for a wavelength of 650 nm. In FIG. 11, the aspects other than the above are the same as in FIG. 10. In FIG. 11, components having the same functions as those of the components shown in FIG. 10 are indicated with the same numerals and their detailed descriptions are not repeated.

Sixth Embodiment

Figure 12:
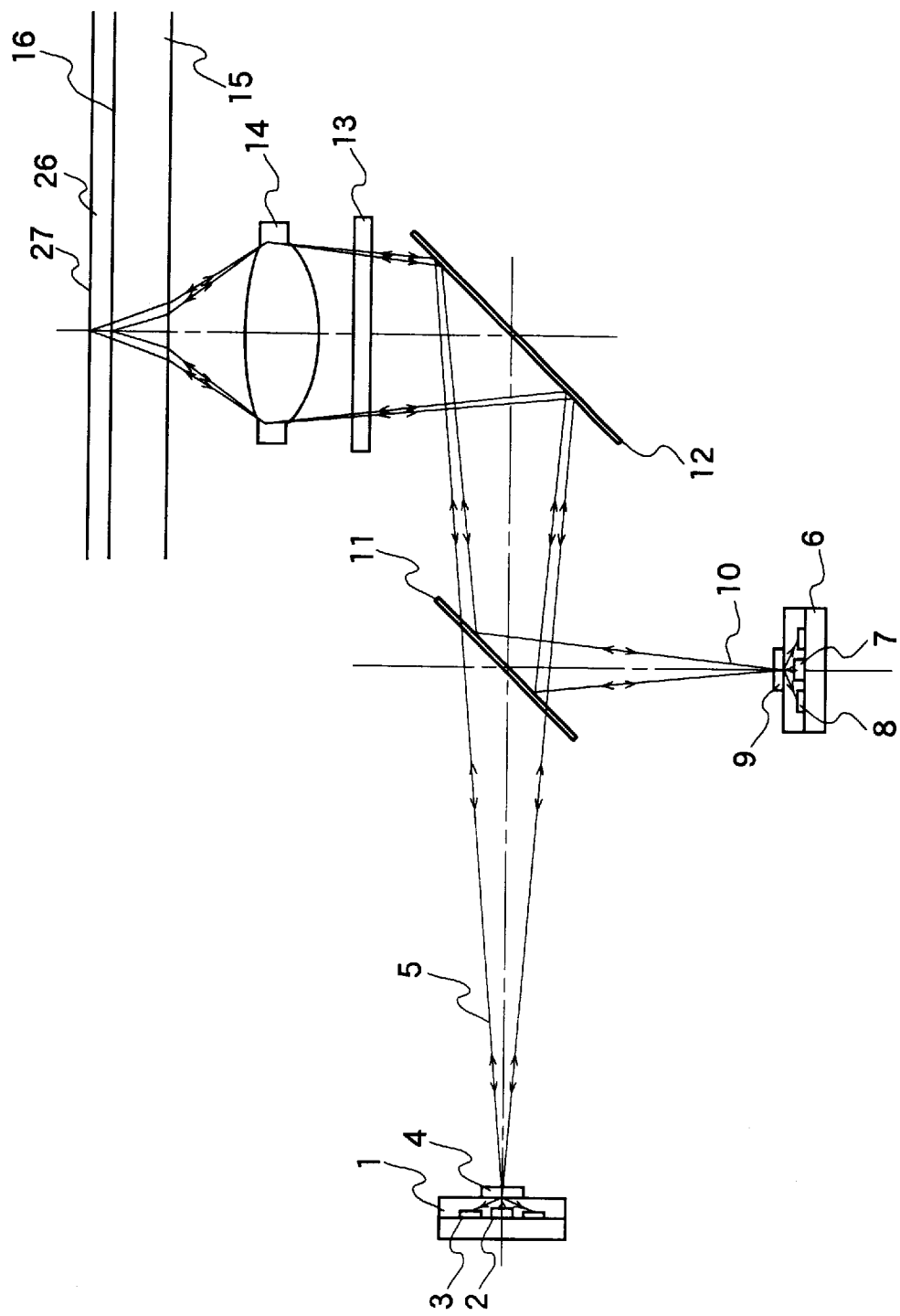
FIG. 12 is a structural view illustrating a recording and reproduction method according to a sixth embodiment of the present invention.
Figure 13:
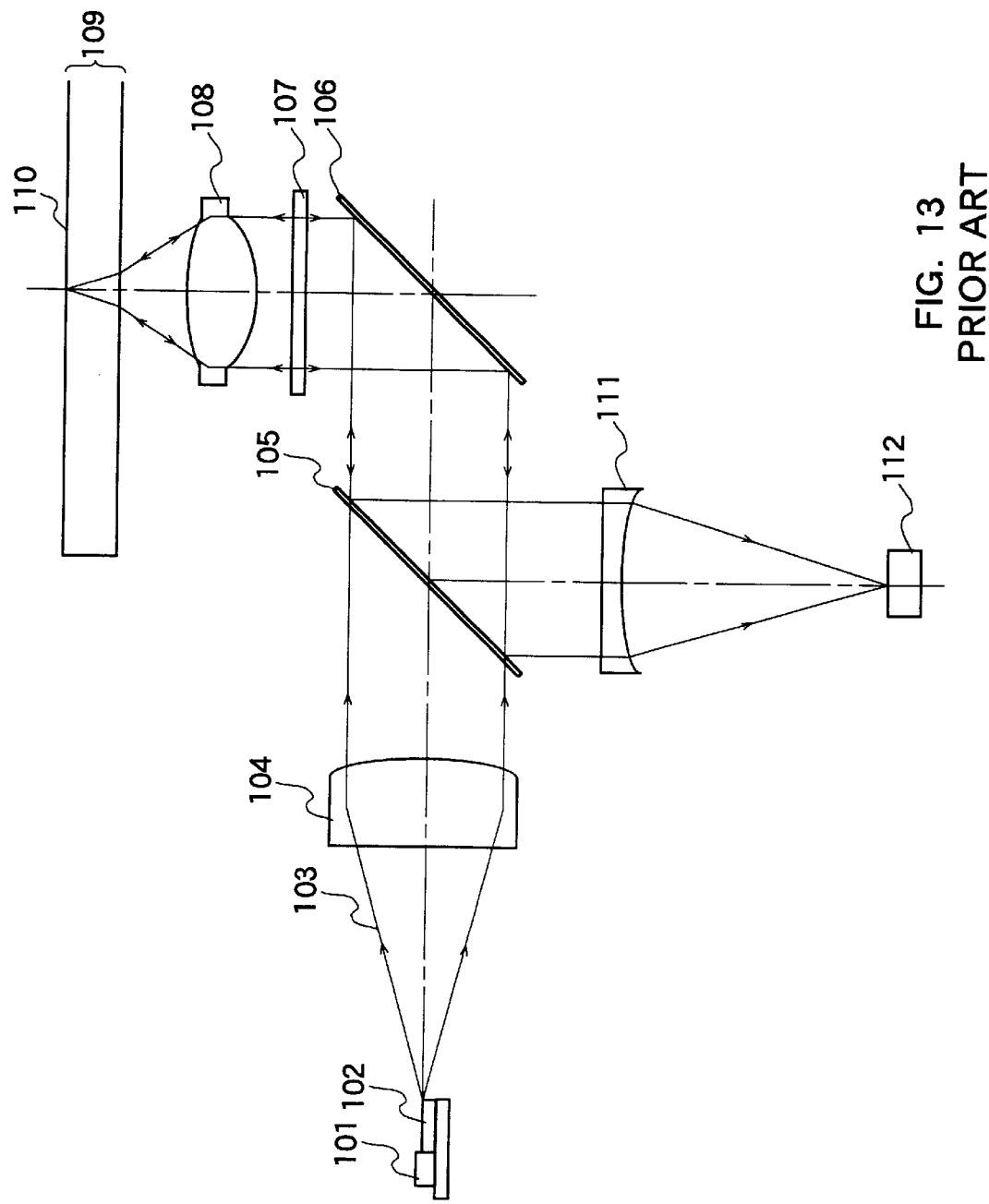
FIG. 13 is a structural view of a conventional optical head including a short-wavelength laser source (for emitting a beam with a wavelength between 350 nm and 500 nm).

FIG. 12 is a view for explaining a recording and reproduction method according to a sixth embodiment of the present invention. In FIG. 12, components having the same functions as those of the components shown in FIG. 10 are indicated with the same numerals and their detailed descriptions are not repeated.

The present embodiment is different from the fifth embodiment in the following point. In the present embodiment, in order to increase recording capacity of an information recording medium, the following information recording medium is used. In the information recording medium, a two-layer structure with a first information recording surface 27 and a second information recording surface 16 is formed on the same base.

Furthermore, two of the information recording media with such a two-layer structure may be bonded so that their information recording surfaces face each other, thus achieving a four-layer structure of information recording surfaces. The present invention can be applied to the information recording medium in which recording and/or reproduction can be carried out from both the upper and lower sides. With such a configuration, the recording capacity of the information recording medium can be further increased.

The aspects other than the above are the same as those in the first, second, third, fourth, and fifth embodiments.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head, comprising:
   a first light source for emitting light with a first wavelength;
   a second light source for emitting light with a second wavelength longer than the first wavelength;
   a third light source for emitting light with a third wavelength longer than the second wavelength; and
   an objective lens for focusing the respective lights with the first, second, and third wavelengths on information recording surfaces of information recording media corresponding to the lights with the respective wavelengths,
   wherein the objective lens is designed so as to reduce aberration with respect to the light with the first wavelength, and
   optical-path lengths from the respective second and third light sources to the objective lens are shorter than an optical-path length from the first light source to the objective lens so that aberration caused by the objective lens due to chromatic dispersion caused by a material of the objective lens is reduced with respect to the respective lights with the second and third wavelengths.

2. The optical head according to claim 1, wherein an aberration correction member for further reducing the aberration caused by the objective lens due to the chromatic dispersion caused by the material of the objective lens is provided in common optical path at least from the first and second light sources to an incident plane of the objective lens.

3. The optical head according to claim 1, wherein an Abbe number of the material of the objective lens is at least 55.

4. The optical head according to claim 1, wherein the objective lens is a single aspherical lens designed so as to correct aberration with respect to light with any one of the wavelengths.

5. The optical head according to claim 1, wherein the objective lens is a combination lens formed of spherical or aspherical lenses in which chromatic aberration and wavefront aberration are corrected with respect to the lights with the respective wavelengths.

6. The optical head according to claim 1, wherein the first, second, and third light sources emit light selectively.

7. The optical head according to claim 1, wherein the first wavelength is in a range between 350 nm and 500 nm, the second wavelength is in a range between 600 nm and 700 nm, and the third wavelength is in a range between 700 nm and 900 nm.

8. The optical head according to claim 2, wherein the aberration correction member is a hologram element for correcting chromatic aberration caused by the objective lens with respect to the light with the first wavelength.

9. The optical head according to claim 2, wherein the aberration correction member is a hologram element for correcting chromatic aberration caused by the objective lens with respect to the light with the second wavelength.

10. The optical head according to claim 8, wherein the hologram element is integrally formed on a surface of the objective lens.

11. The optical head according to claim 9, wherein the hologram element is integrally formed on a surface of the objective lens.

12. The optical head according to claim 2, wherein the aberration correction member is a collimate lens for converting divergent light from the first, second or third light source substantially into parallel light.

13. The optical head according to claim 2, wherein the aberration correction member is a collimate lens designed to cause aberration so as to reduce the aberration caused by the objective lens due to the chromatic dispersion caused by the material of the objective lens.

14. The optical head according to claim 2, wherein the optical path length between the third light source and the objective lens is set so that NA of the objective lens is 0.5 or less with respect to the light with the third wavelength.

15. The optical head according to claim 2, wherein an Abbe number of the material of the objective lens is different from that of a material of the aberration correction member so that the aberration caused by the objective lens due to the chromatic dispersion caused by the material of the objective lens is reduced.

16. An optical head, comprising:
    a first light source for emitting light with a first wavelength;
    a second light source for emitting light with a second wavelength longer than the first wavelength;
    a third light source for emitting light with a third wavelength longer than the second wavelength; and
    an objective lens for focusing the respective lights with the first, second, and third wavelengths on information recording surfaces of information recording media corresponding to the lights with the respective wavelengths,
    wherein the objective lens is designed so as to reduce aberration with respect to the light with the second wavelength, and
    optical-path lengths from the respective second and third light sources to the objective lens are shorter than an optical-path length from the first light source to the objective lens so that aberration caused by the objective lens due to chromatic dispersion caused by a material of the objective lens is reduced with respect to the respective lights with the first and third wavelengths.

17. The optical head according to claim 16, wherein an aberration correction member for further reducing the aberration caused by the objective lens due to the chromatic dispersion caused by the material of the objective lens is provided in common optical path at least from the first and second light sources to an incident plane of the objective lens.

18. A recording and reproduction method, in which with respect to an information recording medium having an information recording surface and a protective layer thereon, information is recorded on and/or reproduced from the information recording surface by projecting light on the information recording medium from a side of the protective layer, wherein an optical head is used, which comprises: a first light source for emitting light with a first wavelength; a second light source for emitting light with a second wavelength longer than the first wavelength; and an objective lens for focusing the light with the first wavelength and the light with the second wavelength on information recording surfaces of information recording media corresponding to the lights with respective wavelengths, the objective lens being designed so as to reduce aberration with respect to the light with the second wavelength, a thickness of a protective layer on one of the information recording surfaces, which corresponds to the light with the first wavelength, is allowed to be different from that of a protective layer on the other information recording surface corresponding to the light with the second wavelength so that aberration caused by the objective lens due to chromatic dispersion caused by a material of the objective lens is reduced with respect to the light with the first wavelength, the lights with the first and second wavelengths entering the objective lens are substantially parallel lights, the protective layer on the information recording surface corresponding to the light with the second wavelength has a thickness in a range of 0.55 mm to 0.65 mm, and the protective layer on the information recording surface corresponding to the light with the first wavelength has a thickness in a range of 0.65 mm to 0.75 mm.

19. The recording and reproduction method of claim 18, wherein an Abbe number of the protective layer on the information recording surface corresponding to the light with the first wavelength is allowed to be different from that of the protective layer on the information recording surface corresponding to the light with the second wavelength so that the aberration caused by the objective lens due to the chromatic dispersion caused by the material of the objective lens is further reduced with respect to the first wavelength.

20. The recording and reproduction method of claim 18, wherein the information recording media comprise a first information recording surface corresponding to the light with the first wavelength, a second information recording surface corresponding to the light with the second wavelength, and first and second protective layers formed on the respective first and second information recording surfaces, recording and/or reproduction are/is carried out by projecting lights on each of the information recording surfaces from the same side, and a thickness of the first protective layer is set so that chromatic aberration caused by the objective lens due to the chromatic dispersion caused by the material of the objective lens is reduced with respect to the light with the first wavelength.

21. The recording and reproduction method according to claim 18, wherein the information recording media are obtained by bonding lamination units together by their information recording surface sides, each of the lamination units comprising a first wavelength, a second information recording surface corresponding to the light with the second wavelength, and first and second protective layers formed on the respective first and second information recording surfaces, and in the information recording media, recording and/or reproduction can be carried out by projecting lights from both sides.

22. The recording and reproduction method according to claim 18, wherein the first wavelength is in a range between 350 nm and 500 nm and the second wavelength is in a range between 600 nm and 700 nm.

* * * * *